May 2, 1939.  C. G. STRANDLUND  2,156,362
CLUTCH
Filed Jan. 27, 1937
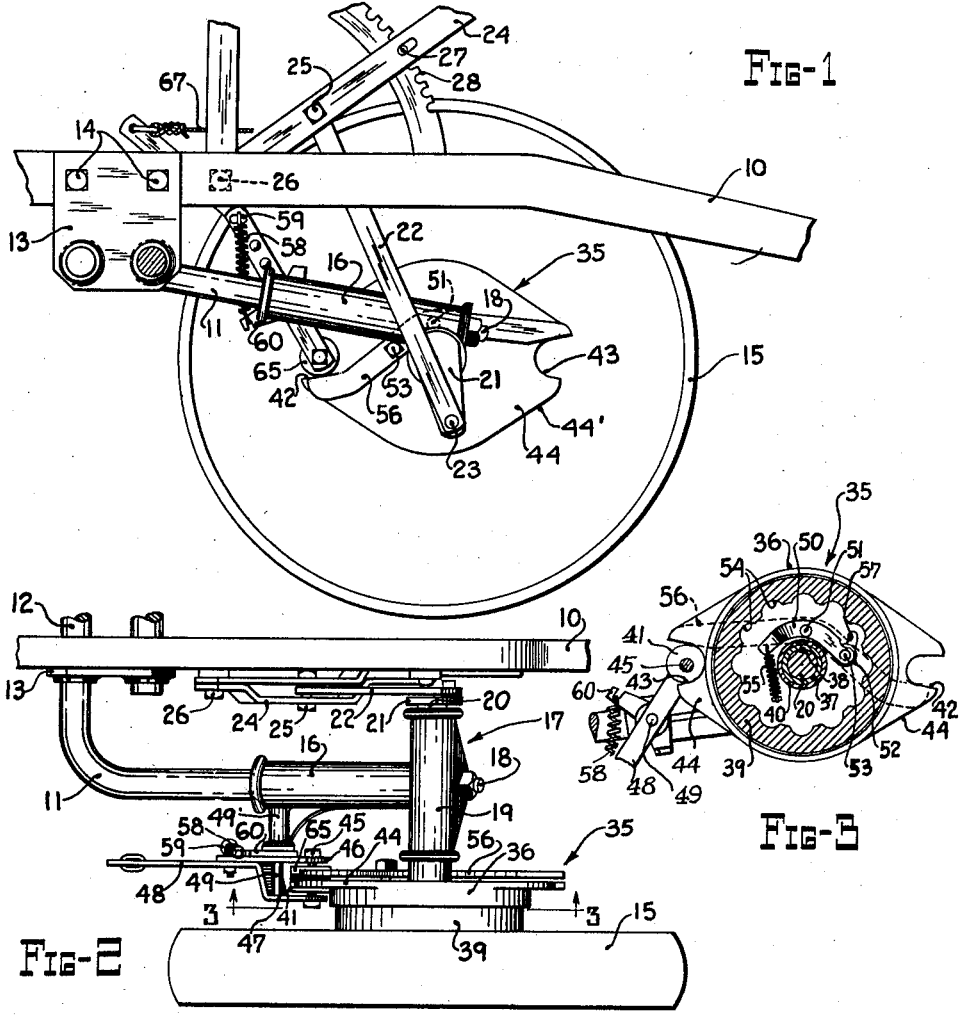
Fig-1
Fig-3
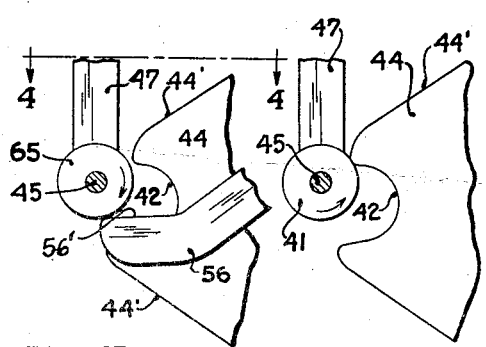
Fig-2
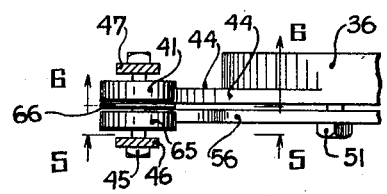
Fig-4
Fig-5   Fig-6
INVENTOR
CARL G. STRANDLUND
BY 
ATTORNEY Patented May 2, 1939

2,156,362

UNITED STATES PATENT OFFICE 2,156,362

CLUTCH

Carl G. Strandlund, Moline, Ill., assignor to Deere & Company, Moline, Ill., a corporation of Illinois Application January 27, 1937, Serial No. 122,583

4 Claims. (Cl. 192—62)

The present invention relates generally to clutches and more particularly to self-interrupting clutches of the type used on agricultural implements and the like, for operatively connecting a normally stationary element to a driving element, which is permanently coupled to one of the wheels of the implement or to any suitable power shaft from which it derives its power.

Clutches of this type are provided with means for automatically disconnecting the driven element from the driving element after the former is rotated through one-half revolution. The rotative power imparted to the driven element during this period of actuation, is applied by means of a crank arm to lifting the implement, or to some other desired function as is well known to those skilled in the art. The object of the present invention is to improve the construction of clutches of this type in order to insure proper operation, with particular reference to insuring that the clutch properly releases and locks out at the end of a lifting operation. This and other objects will be made apparent upon consideration of the following description and explanation of my invention, reference being had to the drawing attached hereto, in which Figure 1 is a fragmentary elevational view of a clutch as applied to an implement such as a plow, for the purpose of raising the implement from a working position to an inoperative or transport position by rotative power obtained from a supporting wheel of the implement.

Figure 2 is a partial plan view of the bottom of the implement.

Figure 3 is a sectional elevation taken along a line 3—3 in Figure 2, but with the clutch rotated one-half revolution from the position shown in Figure 1.

Figure 4 is a detailed plan view taken along line 4—4 in Figure 5 of a portion of the clutch showing the relation between the detent cam, the throwout dog, and the cam follower.

Figure 5 is an elevational view taken along a line 5—5 in Figure 4, and

Figure 6 is an elevational view taken along a line 6—6 in Figure 4.

Referring now to the drawing, reference numeral 10 indicates a beam comprising a portion of the frame or body of an implement such as a plow. The beam is supported on a crank axle 11 having a transversely extending bearing portion 12 and journaled for rotation in a supporting plate 13 attached to the beam by bolts 14. At the lower end of the crank axle 11 the supporting wheel 15 is rotatably mounted in a manner which will hereinafter be described. The lower end of the crank axle 11 is received within a socket member 16 of a casting 17 within which it is secured by means of a bolt 18. The casting 17 is provided with a transversely extending bearing portion 19 within which is journaled a shaft 20 which extends beyond the inner end of the sleeve portion 19, to the end of which is fixed a crank arm 21.

The angular relation between the crank axle 11 and the frame 10 is determined by means of a link 22 pivotally connected to the crank arm 21 by a pin 23 and extending upwardly to a lever 24 to which it is pivoted by means of a bolt 25. The lever 24 is in turn pivoted on a bolt 26 to the beam 10. The lever 24 may be manually adjusted angularly relative to the beam 10 and is held in a fixed position by suitable latching means 27 engaging a notched sector 28 which is fixed to the beam 10. Thus, assuming the shaft 20 to be held against rotation relative to casting 19, by means which will be described later, by swinging the lever 24 about its pivot 26, the crank axle 11 can be swung in its bearing plate 13 for adjusting the height of the beam 10 above the ground. Furthermore, it is evident that when the shaft 20 is rotated a half revolution, the crank arm 21, acting through the link 22 and lever 24, will force the beam 10 upwardly with respect to the wheel 15, for raising the implement from working position to transport position. This shaft 20 is rotated by means of a clutch mechanism indicated generally by the reference numeral 35, operated by power derived from the rotation of the ground wheel 15.

The clutch mechanism 35, which is well known in the art, comprises a normally non-rotative cup shaped housing member 36 fixed to a sleeve 37, which embraces the shaft 20 (Figure 3) and is keyed thereto by a key 38. Rotatable within the housing portion 36 is a cooperative clutch element 39, which is fixed to the ground wheel 15 and is, therefore, rotatable therewith. The wheel 15 is supported on a hub 40, which is journaled upon the sleeve 37. Hence the cooperative clutch element 39 may be termed the normally rotative member since it rotates with the wheel as the implement advances. The housing element 36 of the clutch 35 is normally held against rotation with the wheel 15 by means of a roller 41, which rests in one of two oppositely disposed notches 42, 43 formed in a flange 44 extending radially outwardly from the periphery of the housing 36. The roller 41 is journaled for rotation on a bolt 45 supported at each end in the legs 46, 47 of a bifurcated tripping lever 48 which is pivotally supported on a pin 49 fixed in a boss 49' which is formed integrally with the casting 17. By swinging the lever 48 about its pivot 49, the roller 41 can be swung out of the notch 42 or 43, releasing the housing element 36 for rotation. The edges 44' of the flange 44 are sloped inwardly at each side of the notches 42, 43 and form camming surfaces merging into the periphery of the housing member 36 upon which the roller 41 rolls in order to drop into the respective notches. The roller is held against the camming surfaces by a spring 58, which acts in tension between a lug 59 on the tripping lever 48 and an arm 60 fixed to the boss 49' on the casting 17. As viewed in Figure 1, the spring acts to swing the lever 48 counter-clockwise, thus forcing the roller into the notch 42.

Connection between the normally non-rotative element 36 and the normally rotative element 39 is accomplished by means of a pawl arm 50 pivotally connected to the side wall of the clutch member 36 by means of a pin 51. At one end of the pawl arm 50 is journaled a clutch roller 52 on a pin 53. When the arm 50 is swung about its pivot 51 in a counter-clockwise direction as viewed in Figure 3, the clutch roller 52 is swung into engagement with one of a plurality of notches 54 formed on the inner surface of the annular member 39. A spring 55 connected to the opposite end of the pawl arm yieldingly urges the roller into engagement with the notches of the normally rotative element 39. Normally, however, the pawl arm 52 is held out of engagement in the position shown in Figure 3, by means of a throwout dog 56 which is also pivoted on the pawl arm pivot pin 51, but on the outside of the clutch housing member 36. The clutch roller pin 53 extends through a slot 57 in the wall of the housing 36 and is fastened to the throwout dog 56. Thus the pawl arm 50 can be swung into and out of engagement with the notches 54 by swinging the throwout dog 56 about the pivot 51.

Coming now to that portion of the clutch mechanism with which the present invention is particularly concerned, heretofore the roller 41 has been made long enough axially to extend substantially from one of the legs 46 to the other 47, thus serving as a detent for engaging the notches to hold the clutch member 36 stationary when not in raising or lowering operation, and also engaging the throwout dog 56 to hold the pawl roller 52 out of engagement with the notches 54. This construction, however, is subject to the disadvantage that, at times, the roller has been known to fail to drop completely into the notch, thus failing to fully disengage the clutch when the implement is raising, whereupon the implement immediately lowers once more in the succeeding half revolution of the ground wheel. The reason for this is made evident by Figures 5 and 6. As the roller 41 rolls over the lip of the notch 42 it rotates in a counter-clockwise direction as viewed in Figure 6. When the other end of a conventional roller engages the camming surface 56' of the throwout dog 56, however, the roller tends to rotate in the opposite, or clockwise direction, as indicated in Figure 5. Hence, a conventional single roller tends to become wedged between the side of the notch and the throwout dog, and during the remainder of its movement into the notch it must force the throwout dog away from the open side of the notch by a sliding, rather than a rolling action. After the clutch mechanism becomes worn and dirty, the resistance to this wedging action sometimes becomes greater than the force exerted by the tension spring 58 upon the lever 48, causing the clutch to maintain its engagement, forcing the roller over the end of the throwout dog 56 for another half cycle of operation.

According to the principles of the present invention, the cam following roller 41 is only of sufficient axial length to engage the camming surfaces 44' and does not extend beyond the side of the flange 44, and so does not engage the throwout dog 56. A second roller 65 is journaled for rotation on the bolt 45 and is disposed in register with the throwout dog. Thus the second roller engages the dog but not the camming surface 44'. The two rollers 41, 65 are separated by a spacing washer 66 disposed between them on the shaft or bolt 45. Since the second roller 65 is rotatable on the bolt 45 independent of the first roller 41, when the roller 65 engages the camming surface 56' of the dog 56, the roller is free to rotate in the direction of rotation opposite to that of the cam roller 41 as indicated by the arrows in Figures 5 and 6, and therefore rolls on the throwout dog as the cam roller 41 rolls into the notch. This practically eliminates the binding due to friction between the camming parts of the clutch, and has been found to veritably insure that the clutch is locked out of engagement at the end of the lifting operation.

The clutch is operated by means of a rope 67 (Figure 1) attached to the tripping lever 48. When the rope is pulled, the lever swings the rollers out of engagement with the notch and the throwout dog, allowing the pawl spring 55 to swing the pawl arm 50, engaging the roller 52 with one of the notches 54 in the rotating element 39. The housing member 36 is thus rotated a half revolution during which time the operator releases the rope allowing the roller 41 to roll on the housing 36, up the camming surface 44' and into the opposite notch 43, whereupon the other roller 65 engages the opposite end of the throwout dog, swinging the latter to again disengage the clutch. Another pull on the rope 67 initiates another half revolution of the clutch to its original position.

I claim:

1. In a clutch of the class described, the combination of an optionally rotated member having a camming surface including a notch, a throwout dog pivotally disposed on the side of said member, means for yieldingly urging said throwout dog into a position partially closing one end of said notch, said dog and one side of said notch presenting oppositely disposed surfaces, a tripping lever having cam follower means adapted to follow said camming surface and wedge between said oppositely disposed surfaces as said cam follower means seats in said notch, thereby forcing said throwout dog away from the end of said notch, said cam follower means comprising a shaft fixed to said lever, a first roller journaled on said shaft and adapted to roll on said camming surface and into said notch, and a second roller journaled on said shaft adjacent to said first roller and free of said camming surface for engaging only said throwout dog and rolling thereon in a direction of rotation opposite to that of the first said roller.

2. In a clutch mechanism of the class described comprising a normally rotative member, a normally non-rotative member having a peripheral camming surface including a notch, means for optionally connecting said members together to effect rotation of the latter member, a throwout dog pivoted on the side of said latter member for disconnecting said members after a predetermined extent of rotation, and means for yieldingly urging said throwout dog into a position partially closing one end of said notch, said dog and one side of said notch presenting oppositely disposed surfaces, a tripping lever, and cam follower means on said tripping lever for following said peripheral camming surface and entering between said oppositely disposed surfaces to force said throwout dog away from said side of said notch, thereby effecting a disconnection of said members, said cam follower means comprising a shaft fixed to said lever and a pair of rollers independently rotatably disposed on said shaft, one of said rollers being disposed in registry with said camming surface and adapted to roll thereon and into engagement with said notch, the other of said rollers being disposed in registry with said throwout dog and adapted to roll thereon as said one roller rolls into said notch but in the opposite direction of rotation to that of said one roller.

3. In a clutch of the class described, an optionally rotative member having a camming surface, a throwout dog pivotally connected to said member and disposed adjacent to said camming surface, said throwout dog having a camming surface disposed in opposition to said camming surface on the clutch member, and cam follower means for spreading said throwout dog and said clutch member camming surfaces apart, said means comprising a pair of relatively rotatable, coaxially disposed rollers, one of said rollers being located so as to roll only on said clutch member and the other roller being located so as to roll only on said throwout dog camming surface but in the opposite direction of rotation to that of said one roller when spreading said dog and said member apart.

4. In a clutch of the class described, an optionally rotative member having a peripheral camming surface, a throwout dog pivotally connected to said member and disposed for swinging movement adjacent the edge of said camming surface, said throwout dog having a camming surface inclined oppositely to said camming surface on the clutch member to define a notch therebetween, and cam follower means biased to follow said peripheral camming surface and to wedge between said oppositely inclined camming surfaces to force said dog to swing relative to said clutch member and widen said notch therebetween, said cam follower means comprising a trip lever and a pair of relatively rotatable rollers journaled thereon, one of said rollers being disposed to roll only on said clutch member and the other roller being disposed to engage said throwout dog and to roll upon the latter in a direction of rotation opposite to that of the other roller as said rollers enter the notch between said camming surfaces.

CARL G. STRANDLUND.